(12) United States Patent
Oonuma et al.

(10) Patent No.: US 9,837,643 B2
(45) Date of Patent: Dec. 5, 2017

(54) FILM COVERED BATTERY AND METHOD FOR SCREENING SAME

(75) Inventors: Tsuguhiro Oonuma, Tokyo (JP);
Masatomo Mizuta, Kawasaki (JP);
Yuko Hayashi, Sagamihara (JP);
Akinori Miura, Sagamihara (JP);
Tetsuya Yakawa, Tochigi (JP)

(73) Assignees: AUTOMOTIVE ENERGY SUPPLY CORPORATION, Zama-shi (JP);
NISSAN MOTOR CO., LTD., Yokohama-shi (JP)

( * ) Notice: Subject to any disclaimer, the term of this patent is extended or adjusted under 35 U.S.C. 154(b) by 353 days.

(21) Appl. No.: 13/976,587

(22) PCT Filed: Dec. 5, 2011

(86) PCT No.: PCT/JP2011/078099
§ 371 (c)(1),
(2), (4) Date: Jun. 27, 2013

(87) PCT Pub. No.: WO2012/090652
PCT Pub. Date: Jul. 5, 2012

(65) Prior Publication Data
US 2013/0284531 A1  Oct. 31, 2013

(30) Foreign Application Priority Data
Dec. 28, 2010  (JP) ................. 2010-239001

(51) Int. Cl.
*H01M 2/02* (2006.01)
*H01M 2/06* (2006.01)
(Continued)

(52) U.S. Cl.
CPC ............ *H01M 2/0237* (2013.01); *B60K 1/04* (2013.01); *H01M 2/0262* (2013.01); *H01M 2/0267* (2013.01); *H01M 2/0469* (2013.01); *H01M 2/06* (2013.01); *H01M 2/1072* (2013.01); *H01M 2/1077* (2013.01);
(Continued)

(58) Field of Classification Search
CPC .................................................. H01M 2/1077
See application file for complete search history.

(56) References Cited

U.S. PATENT DOCUMENTS

2003/0017388 A1* 1/2003 Furusaki ............ H01M 2/0212
429/162
2003/0232236 A1* 12/2003 Mitchell ............ H01M 2/0212
429/56
(Continued)

FOREIGN PATENT DOCUMENTS

CN  201681980 U  12/2010
JP  2003-92132 A  3/2003
(Continued)

*Primary Examiner* — Ula C Ruddock
*Assistant Examiner* — Gregory Passa
(74) *Attorney, Agent, or Firm* — Foley & Lardner LLP

(57) ABSTRACT

A film covered battery has a battery element equipped with a plurality of electrode plates laminated via separators, and an exterior film for hermetically sealing the battery element. A cover film is attached to a hollow present in predetermined regions set on a surface of the exterior film. The predetermined regions are regions obtained by removing overlap regions from projected regions obtained by projecting the electrode plates to the surface of the exterior film, the overlap regions being regions where the projected regions overlap with members interposed between the electrode plates at the outermost layers and the exterior film. It is possible to cover the hollow on the surface, without increasing the thickness of the film covered battery.

12 Claims, 8 Drawing Sheets

(51) Int. Cl.
*H01M 2/10* (2006.01)
*H01M 2/04* (2006.01)
*H01M 2/30* (2006.01)
*B60K 1/04* (2006.01)
*H01M 2/26* (2006.01)
*H01M 10/04* (2006.01)
*H01M 2/08* (2006.01)

(52) U.S. Cl.
CPC ......... H01M 2/1083 (2013.01); H01M 2/266 (2013.01); H01M 2/305 (2013.01); H01M 10/0413 (2013.01); H01M 2/08 (2013.01); H01M 2220/20 (2013.01); Y10T 29/4911 (2015.01)

(56) References Cited

U.S. PATENT DOCUMENTS

2004/0038125 A1* 2/2004 Kim ..................... H01M 2/021
429/162

2007/0231701 A1* 10/2007 Lee ......................... H01M 2/18
429/246
2011/0003198 A1* 1/2011 Noda ....................... H01G 9/08
429/185
2013/0284531 A1 10/2013 Oonuma et al.

FOREIGN PATENT DOCUMENTS

| | | |
|---|---|---|
| JP | 2006-294351 A | 10/2006 |
| JP | 2006-294351 A | 10/2006 |
| JP | 2007-265863 A | 10/2007 |
| JP | 2007-265863 A | 10/2007 |
| JP | 2009-43442 A | 2/2009 |
| JP | 2009-043442 A | 2/2009 |
| JP | 2012-142144 A | 7/2012 |
| RU | 2331142 C1 | 8/2008 |
| RU | 2355070 C1 | 5/2009 |
| WO | WO 2006/043760 A1 | 4/2006 |
| WO | WO 2006/104331 A1 | 10/2006 |

* cited by examiner

FILM COVERED BATTERY AND METHOD FOR SCREENING SAME

TECHNICAL FIELD

The present invention relates to a film covered battery.

BACKGROUND ART

A generally-known film covered battery has a battery element and an exterior film for hermetically sealing the battery element. The exterior film has at least a heat-fusion bonding layer, a metal layer, and a protective layer.

In a manufacturing process of the film covered battery having the previously-discussed structure, a very small hollow may occur on the surface of the film covered battery due to an external force. For instance, when the film covered battery is picked up by means of a robot hand, a very small hollow may occur on the surface of the protective layer of the exterior film.

In order to prevent the surface of a laminated film from being damaged or stained during the manufacturing process, Patent document 1 teaches a method of manufacturing a laminated battery using a laminated film with a protective film attached to a protective layer. In the Patent document 1, the protective film, whose adhesive strength decreases by ultraviolet irradiation, is attached to the surface of the laminated film in advance, and a film covered battery is manufactured, using a battery element as well as the laminated film, and thereafter only the protective film is removed by ultraviolet irradiation.

However, the previously-discussed method requires a process for exfoliating the protective film. Assuming that a hollow has already occurred on the protective layer before attaching the protective film, such a hollow is exposed by exfoliating the protective film. In contrast, assuming that, for the purpose of covering the hollow, the protective film is left on the surface of the laminated film, in the Patent document 1 the thickness of the film covered battery increases because of the protective film attached over the entire surface of the protective layer of the laminated film.

In many cases, a film covered battery is used in a state where a large number of film covered batteries are stacked up in their thickness directions. Thus, even when there is a slight increase in thickness of a single film covered battery, the total thickness of the stacked or assembled film covered batteries greatly increases.

It is an object of the invention to cover a hollow occurring on a surface of a film covered battery without increasing the thickness of the film covered battery.

CITATION LIST

Patent Literature

Patent document 1: Japanese patent provisional publication No. 2009-043442 (A)

SUMMARY OF INVENTION

A film covered battery of the invention has a battery element equipped with a plurality of electrode plates laminated via separators, an exterior film for hermetically sealing the battery element, and a cover film attached to a hollow present in predetermined regions set on a surface of the exterior film. The predetermined regions are regions obtained by removing overlap regions from projected regions obtained by projecting the electrode plates to the surface of the exterior film, the overlap regions being regions where the projected regions overlap with members interposed between the electrode plates at the outermost layers and the exterior film or between the electrode plates and the separators.

For instance, the aforementioned members include a binding member, whose ends are fixed to respective surfaces of the electrode plates at the outermost layers.

In one aspect of the invention, the predetermined regions include a first region set on one surface of the exterior film and a second region set on the other surface of the exterior film. The first region is a region obtained by removing a first overlap region from a projected region obtained by projecting the electrode plate at the uppermost layer to the one surface of the exterior film, the first overlap region overlapping with one end of each of binding members fixed to the one surface of the electrode plate at the uppermost layer. The second region is a region obtained by removing a second overlap region from a projected region obtained by projecting the electrode plate at the lowermost layer to the other surface of the exterior film, the second overlap region overlapping with the other end of each of the binding members fixed to the other surface of the electrode plate at the lowermost layer. The cover film is attached to at least one of the first region and the second region.

For instance, the previously-discussed members include insulating films placed between the electrode plates and the separators. In another aspect of the invention, each of the previously-discussed members include a binding member, whose ends are fixed to respective surfaces of the electrode plates at the outermost layers, and insulating films placed between the electrode plates and the separators.

Furthermore, electrode plates, each of which has a relatively large area, and electrode plates, each of which has a relatively small area, are included in the plurality of electrode plates constructing the battery element. It is preferable that the electrode plates, constructing the above-mentioned projected regions, are the electrode plates, each having the relatively small area.

A battery module of the invention has a plurality of film covered batteries of the invention and a case in which the plurality of film covered batteries are housed in a stacked state. The plurality of film covered batteries are stacked along a direction of laminating of the electrode plates constructing the battery element.

In the module assembly of the invention, a plurality of battery modules of the invention are laid out in a stacked state, and the plurality of battery modules are connected to each other.

In an electric vehicle made according to the invention, the above-mentioned module assembly of the invention is placed under a vehicle seat.

Moreover, the invention includes a method for screening a film covered battery, whose battery element is equipped with a plurality of electrode plates laminated via separators and hermetically sealed by an exterior film, before attaching a cover film to a hollow on a surface. The method has a step (a process) for discriminating the presence or absence of the hollow on the surface of the film covered battery, and a step (a process) for determining whether a position of the hollow is within predetermined regions. The above-mentioned predetermined regions are regions obtained by removing overlap regions from projected regions obtained by projecting the electrode plates to a surface of the exterior film, the overlap regions being regions where the projected regions overlap with members interposed between the electrode plates at the outermost layers and the exterior film or between the electrode plates and the separators.

In a further aspect of the invention, the method further includes a step for determining whether the cover film, having a predetermined size for covering the hollow, protrudes from the predetermined regions.

According to the invention, it is possible to cover the hollow occurred on the surface of the film covered battery by the cover film attached to the surface of the exterior film, without increasing the thickness of the film covered battery.

DESCRIPTION OF EMBODIMENTS (Film Covered Battery)

Figure 1:
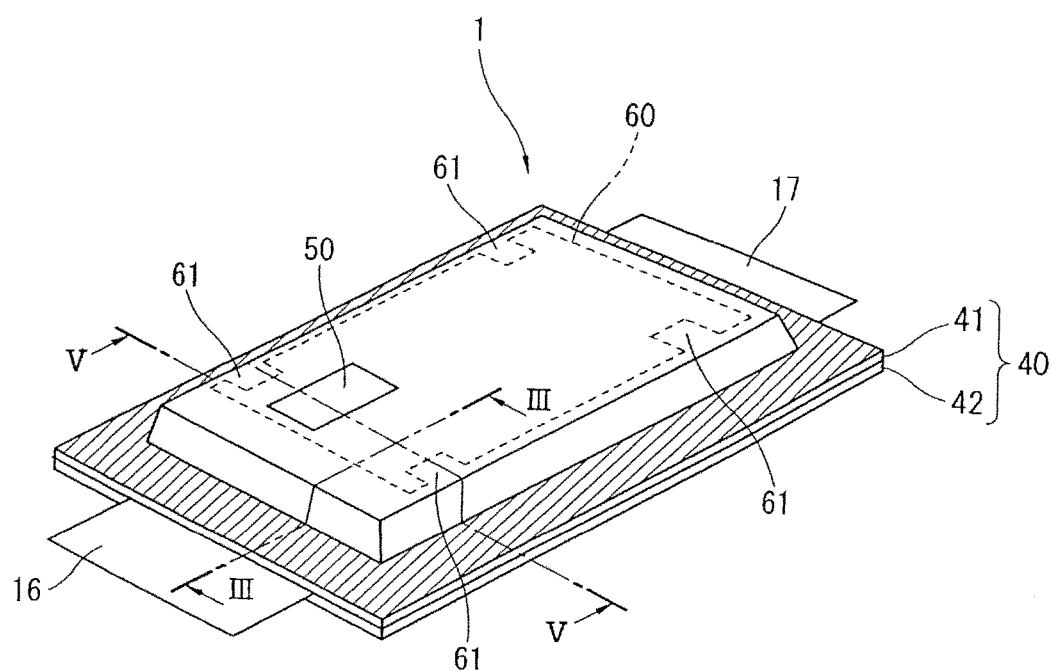
FIG. 1 is a perspective view illustrating the appearance of an embodiment of a film covered battery.
Figure 2:
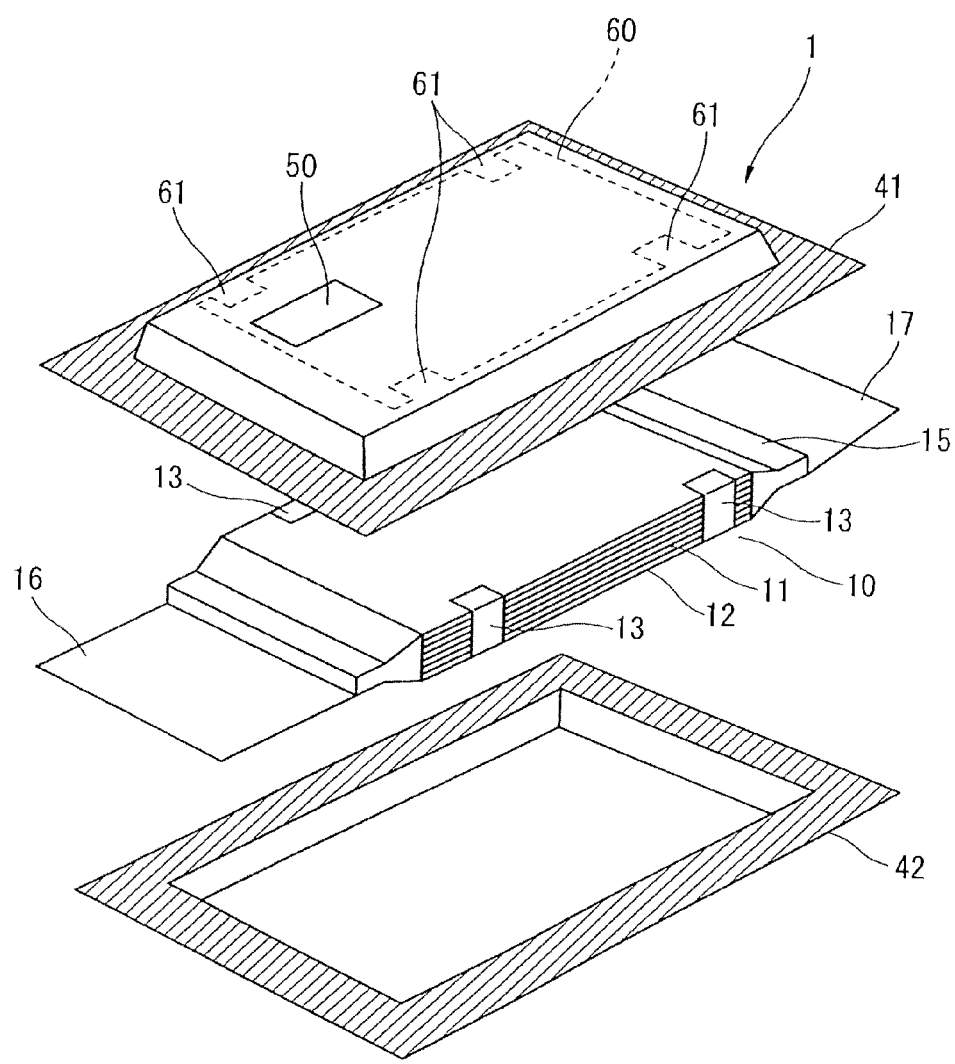
FIG. 2 is an exploded perspective view illustrating the film covered battery shown in FIG. 1.
Figure 3:
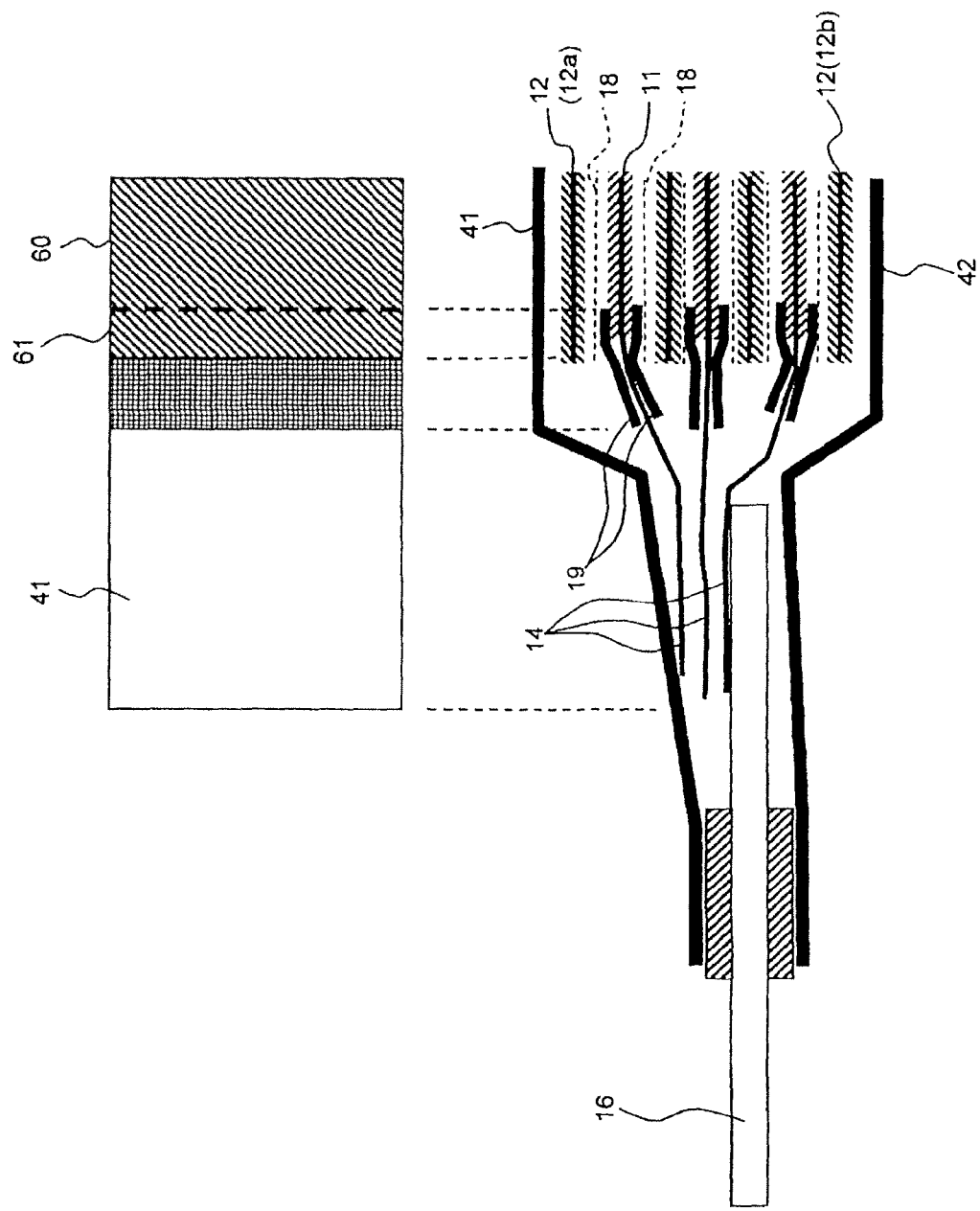
FIG. 3 is an enlarged cross-sectional view taken along the line in FIG. 1.

The embodiment made according to the invention is hereinafter described. FIG. 1 is the perspective view illustrating the appearance of a film covered battery 1 of the embodiment, whereas FIG. 2 is the exploded perspective view. Also, FIG. 3 is the enlarged cross-sectional view taken along the line III-III in FIG. 1. As shown in these figures, the film covered battery 1 is formed into a flat rectangular shape. The film covered battery has a battery element 10, and two films 41 and 42 for hermetically sealing the battery element 10.

As shown in FIG. 2, battery element 10 has a plurality of rectangular electrode plates, comprised of positive electrode plates 11 and negative electrode plates 12, laminated alternately via separators 18 (see FIG. 3). The size (i.e., the area) of the positive electrode plate 11 is dimensioned to be less than that of the negative electrode plate 12. Binding members (tapes 13) are attached to two opposed long-side walls of the battery element 10 for binding the positive electrode plates 11 and the negative electrode plates 12 together. More concretely, tapes 13 are attached to two points of each of the long-side walls respectively. Each tape 13 is attached to extend over the electrode plate at the uppermost layer (i.e., the negative electrode plate 12a shown in FIG. 3) and the electrode plate at the lowermost layer (i.e., the negative electrode plate 12b shown in FIG. 3) through the sidewall surface of the battery element 10. In other words, one end of each tape 13 is attached to the surface of the negative electrode plate 12a at the uppermost layer, whereas the other end of each tape 13 is attached to the surface of the negative electrode plate 12b at the lowermost layer. By the way, the thickness of tape 13 is approximately 50 μm.

A positive-electrode extension 14 is drawn out from each of the positive electrode plates 11, whereas a negative-electrode extension 15 is drawn out from each of the negative electrode plates 12. Furthermore, each of the positive-electrode extensions 14 is collectively joined to one end of a positive electrode lead 16, whereas each of the negative-electrode extensions 15 is collectively joined to one end of a negative electrode lead 17.

As shown in FIG. 3, a positive-electrode active material is applied to both faces of the positive electrode plate 11, whereas a negative-electrode active material is applied to both faces of the negative electrode plate 12. An insulating layer 19 is placed between the positive electrode plate 11 and the separator 18. Concretely, to provide the insulating layer 19, an insulating film is laid out between the positive electrode plate 11 and each of the separators 18 located on both sides of the same positive electrode plate, in a manner so as to straddle the border between the positive-electrode active material coated area and the positive-electrode extension 14. In other words, one end of the insulating layer 19 is laid out to cover an end of the positive-electrode active material applied to the positive electrode plate 11, whereas the other end is laid out to cover the root of the positive-electrode extension 14 extending outside of the separator 18. By the way, the thickness of the insulating layer 19 is approximately 30 μm.

Figure 4:
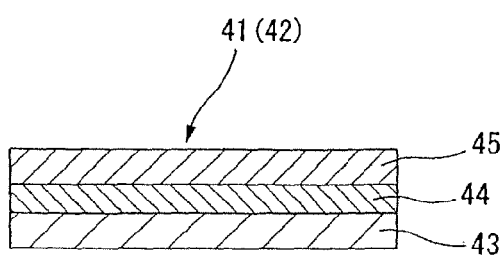
FIG. 4 is a schematic cross-sectional view illustrating the laminated structure of the film.

Each of films 41 and 42 is a laminate film having the laminated structure shown in FIG. 4. That is to say, each of films 41 and 42 has at least a heat-fusion bonding layer (or a heat-sealing layer) 43, a metal layer 44, and a protective layer 45. Heat-fusion bonding layer 43 is formed of polypropylene (PP), metal layer 44 is formed of aluminum (Al), and protective layer 45 is formed of polyethylene terephthalate (PET). The thickness of each of films 41-42 is approximately 120 μm, whereas the thickness of protective layer 45 is approximately 20 μm. By the way, the thickness of each of films 41-42 and/or the thickness of each of the layers may be appropriately changed. Additionally, the material of each of the layers is not limited to the particular embodiments shown and described herein.

Returning again to FIG. 2, films 41-42 are laid out, such that their heat-fusion bonding layers 43 (see FIG. 4) are arranged to be inwardly opposed to each other and that the battery element 10 is sandwiched between them in the vertical direction. Additionally, the two opposed heat-fusion bonding layers 43 of films 41-42 are heat-bonded each other. In FIG. 2, the heat-bonded area of the heat-fusion bonding layer 43 of each of films 41-42 is indicated as the diagonal shading area. These two films 41-42, integrally connected to each other by heat-fusion bonding, are hereinafter referred to as "exterior film 40".

As shown in FIG. 1, the one end of the positive electrode lead 16 is drawn out from one side (a short side) of the exterior film 40 to extend outside of the exterior film 40. In a similar manner, the one end of the negative electrode lead 17 is drawn out from the other side (the other short side) of the exterior film 40 to extend outside thereof.

Figure 5:
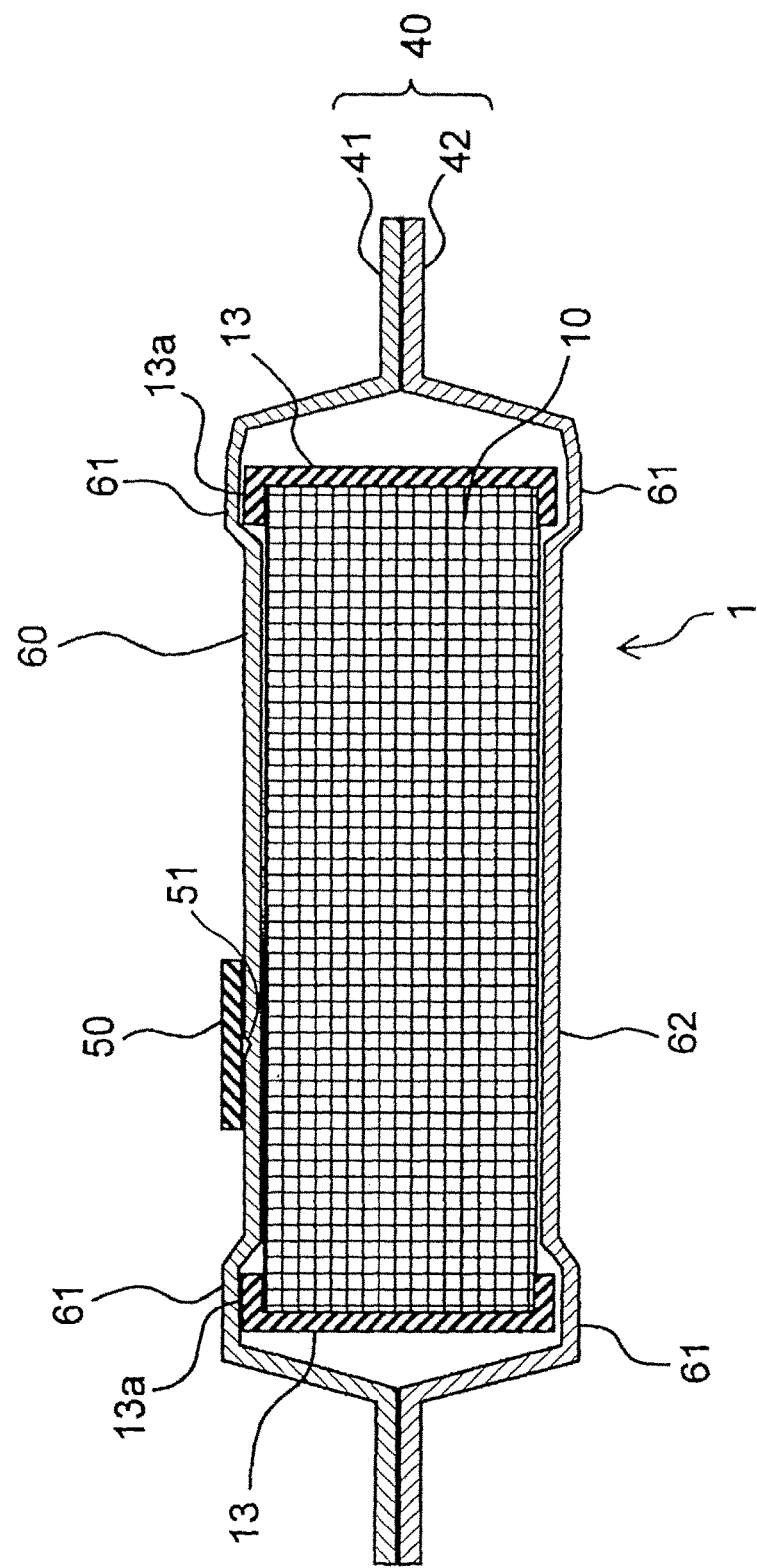
FIG. 5 is a cross-sectional view taken along the line V-V in FIG. 1.

A cover film, which is a feature of the invention, is hereinafter explained. As shown in FIGS. 1-2, the cover film 50 having a thickness of approximately 50 μm is partially attached to the surface of the exterior film 40. FIG. 5 shows the cross section taken along the line V-V of FIG. 1. As shown in FIG. 5, cover film 50 is attached to a very small hollow 51 occurred on the surface of the protective layer 45 (see FIG. 4) of the exterior film 40. The reason for the occurrence of the very small hollow 51 on the surface of the exterior film 40 is as having mentioned previously.

Hereupon, to avoid an increase in the thickness of the film covered battery 1, cover film 50 is attached only within predetermined regions set on the surface of the film covered battery.

The predetermined regions, set based on the above-mentioned purpose, are hereunder described in detail. As shown in FIG. 5, in the shown embodiment, a first region 60 is set on the surface of film 41, whereas a second region 62 is set on the surface of film 42. By the way, the first region 60 and the second region 62 are substantially the same. Thus, the first region 60 set on the surface of film 41 is explained in detail. On the other hand, regarding the second region 62 set on the surface of film 42, only the difference of the second region from the first region 60 will be explained. In FIGS. 1-2, the first region 60 is indicated by the broken line.

The first region 60 set on the surface of film 41 is substantially the same as a projected region obtained by projecting the electrode plate (i.e., the positive electrode plate 11 in FIG. 3) to the surface of film 41 (i.e., the surface of the protective layer 45). The negative electrode plate 12a at the uppermost layer may be used as a projected object, but it is preferable to use, as a projected object for the projected region, the positive electrode plate 11 having a size (an area) less than the negative electrode plate 12a located at the uppermost layer. The reason for this is that, when the internal space of the exterior film 40 is depressurized, ends of films 41-42 tend to be curved toward the electrode side, and hence there is a risk for ends of the negative electrode plate of a relatively large size to be curved. It difficult to attach the cover film 50 to the curved portion.

As shown in FIG. 5, the ends 13a of tapes 13 exist within the previously-discussed projected region. Additionally, as shown in FIG. 3, a part of each of the insulating layers 19 exists within the projected region. Therefore, as shown in FIGS. 3 and 5, the level difference, corresponding to the thickness of tape 13 or the thickness of the insulating layer 19, exists within the projected region. In other words, a region (an overlap region 61) of the projected region, overlapping with the ends 13a of tapes 13 or a part of each of the insulating layers 19, is higher than the other region. Therefore, when the cover film 50 is attached onto the overlap region 61, the thickness of the film covered battery 1 tends to increase by the thickness of the cover film 50. In contrast, when the cover film 50 is attached onto the other region except the overlap region 61, the thickness of the cover film 50 can be absorbed by the level difference between the overlap region 61 and the other region.

By the way, the thickness of the cover film 50 is approximately 50 μm, whereas the thickness of the insulating layer 19 is approximately 30 μm. However, as shown in FIG. 3, the insulating layers 19 are attached to both sides (the upside and the underside, that is, two layers) of each of the positive electrode plate 11. For instance, assuming that insulting layers 19 are respectively attached to both sides of each of three positive electrode plates 11, the thickness becomes 30 μm×(two layers)×three pieces=180 μm. The thickness of 90 μm can be assured toward the upside of the battery, while the thickness of 90 μm can be assured toward the underside of the battery, and hence the thickness of the cover film 50 of 50 μm can be absorbed. Therefore, the level difference, greater than the thickness of the cover film 50, exists between the overlap region of the projected region overlapping with the insulating layers 19 and the other region.

Additionally, the thickness of tape 13 and the thickness of cover film 50 are 50 μm, and hence the level difference for absorbing the thickness of cover film 50 exists between the overlap region of the projected region overlapping with the tapes 13a and the other region.

Briefly, the first region 60 set on the surface of film 41 is a region obtained by removing the first overlap region 61 from the projected region obtained by projecting the positive electrode plate 11 to the surface of film 41. On the other hand, the second region 62 set on the surface of film 42 is a region obtained by removing the second overlap region 61 from the projected region obtained by projecting the positive electrode plate 11 to the surface of film 42.

It will be understood from the previously-discussed explanation that, in the first embodiment, the predetermined regions, set based on the above-mentioned purpose, are the remaining regions obtained by removing the overlap regions, overlapping with members (tapes 13a) interposed between the electrode plates at the outermost layers and the exterior film and members (insulating layers 19) interposed between the electrode plates and the separators, from the projected region obtained by projecting the electrode plates to the surface of the exterior film. By the way, in the battery element 10 shown in FIG. 5, some kind of members, except the ends of tapes 13, may be interposed between the electrode plates at the outermost layers and the film 41. In such a case, an overlap region of the projected region, overlapping with this kind of members, is also included in the overlap region 61.

By the way, at least one of the electrode plate at the uppermost layer and the electrode plate at the lowermost layer in the battery element 10 may be a positive electrode plate. Even when the positive electrode plate is placed at the uppermost layer, it is preferable to use the positive electrode plate having a smaller area as a projected electrode plate, constructing the projected region.

Also, either one of tapes 13 and insulating layers 19 shown herein may be eliminated. It will be clear from the previously-discussed explanation that the first region 60 and the second region 62 may be enlarged by eliminating either one of tapes 13 and insulating layers 19.

By the way, cover film 50 shown herein is rectangular, but the shape of cover film 50 is not limited to such a rectangular shape. Additionally, it is preferable that the shortest distance between the border of the very small hollow 51 and the border of the cover film 50 is 5 mm or more. Furthermore, the cover film 50 of the shown embodiment has a two-layer structure comprised of an adhesive layer and a resin layer. A released paper is attached to the adhesive layer. When attaching the cover film 50 to the surface of the exterior film 40, the released paper is peeled off, and thus the adhesive layer is exposed. However, the structure of cover film 50 is not limited to the above-mentioned structure. Furthermore, two or more cover films 50 may be attached to the surface of the exterior film 40 without overlapping each other. Moreover, a plurality of cover films, differing from each other in size and/or thickness, may be used in combination.

(Battery Module)

Figure 6:
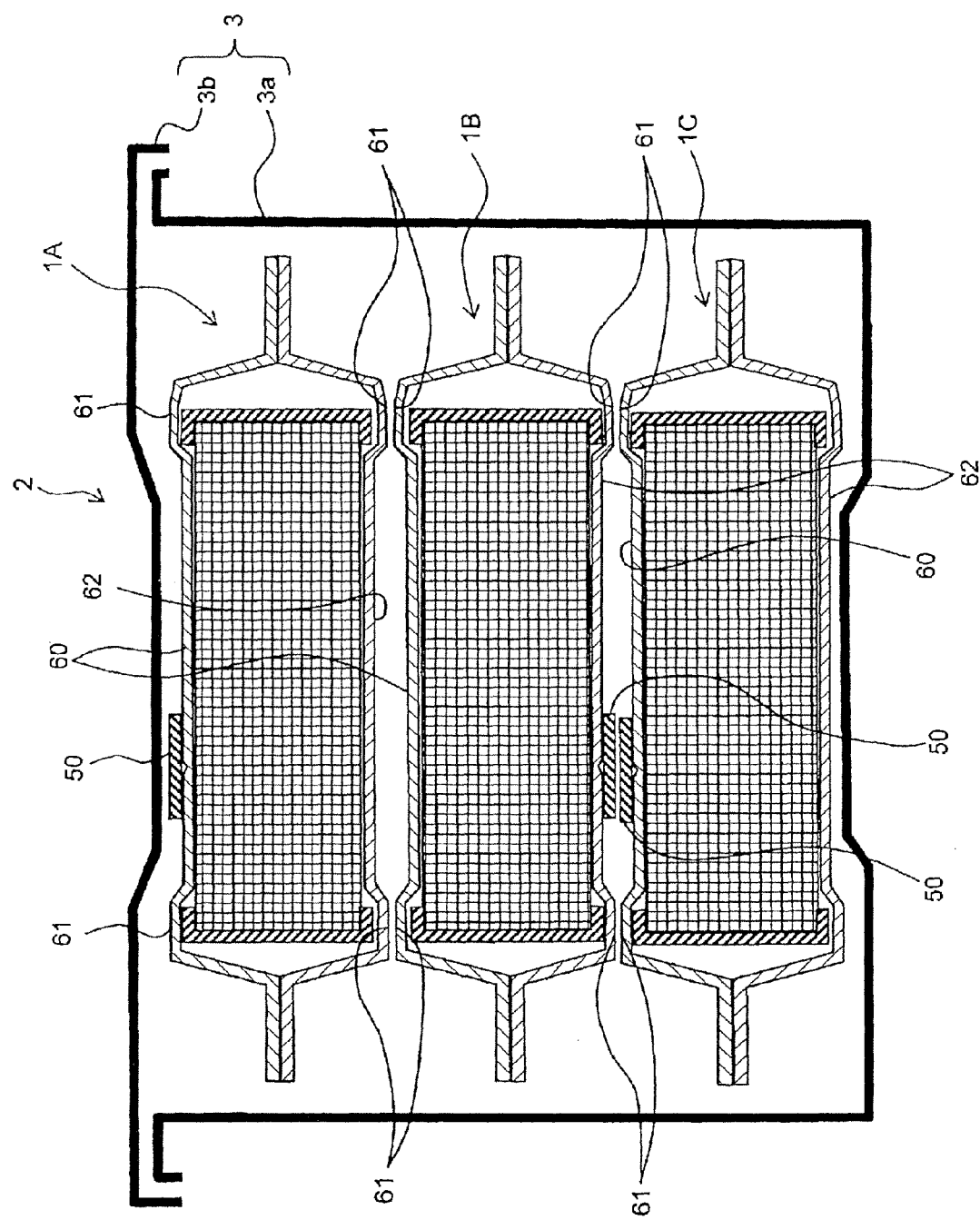
FIG. 6 is a cross-sectional view illustrating an embodiment of a battery module.

Referring to FIG. 6, there is shown one example of a battery module 2 using the film covered battery of the invention. In the shown battery module 2, three film covered batteries 1A, 1B, and 1C are housed in a module case 3, and unified together. Module case 3 is constructed by a box-type casing main body 3a and a cover 3b. These three film covered batteries 1A-1C are housed in the casing main body 3a, while being stacked up in their thickness directions. Hereupon, the cover films 50 are attached to the first region 60 of the film covered battery 1A of the upper section and the first region 60 of the film covered battery 1C of the lower section, respectively. Additionally, the cover film 50 is attached to the second region 62 of the film covered battery 1B of the middle section. Regarding the film covered batteries 1A and 1C, the thickness of the cover film 50 can be absorbed by the level difference between the first region 60 and the overlap region 61. On the other hand, regarding the film covered battery 1B, the thickness of the cover film 50 can be absorbed by the level difference between the second region 62 and the overlap region 61. That is, in any one of the film covered batteries, there is no increase in thickness due to the attached cover film 50. Thus, the thickness (the height) of the battery module 2 is identical to that of a battery module using film covered batteries to which cover films are not attached. In this manner, even in a battery module that film covered batteries are housed and stacked up in their thickness directions, any increase in thickness does not occur.

(Module Assembly)

Figure 7:
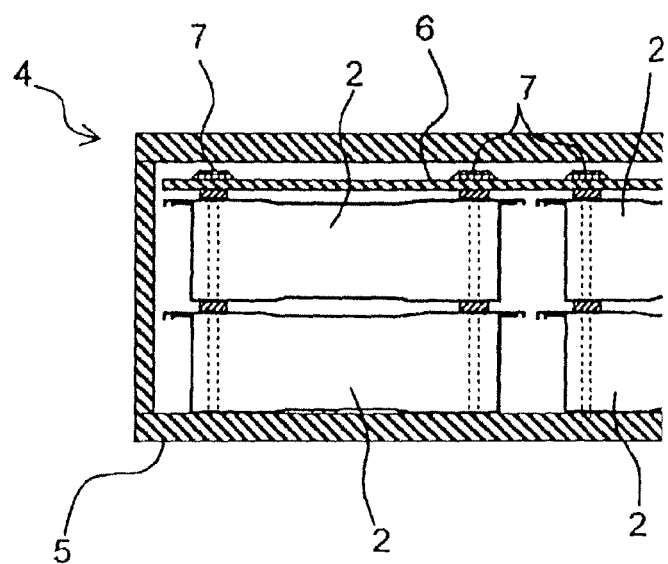
FIG. 7 is a partial cross-sectional view illustrating an embodiment of a module assembly.

Referring to FIG. 7, there is shown one example of a module assembly 4 using the battery module shown in FIG. 6. In the shown module assembly 4, a plurality of battery modules 2 are installed in a housing 5 by a two-step stack. Concretely, each battery module 2 of the upper section is mounted on each battery module 2 of the lower section. A retainer plate 6, which extends over the battery modules adjacent to each other, is mounted on the cover 3b (see FIG. 6) of battery module 2 of the upper section. Bolts 7, each of which passes through the retainer plate 6, are installed to also pass through both of the battery module 2 of the upper section and the battery module 2 of the lower section. In other words, the battery module 2 of the upper section and the battery module 2 of the lower section are fastened and unified together with bolts 7, passing through them, while the battery modules, adjacent to each other, are unified together by means of the retainer plate 6. In this manner, the plurality of battery modules 2 are integrally connected to each other. In other words, housing 5 is not mandatory, but it may be eliminated.

Figure 8:
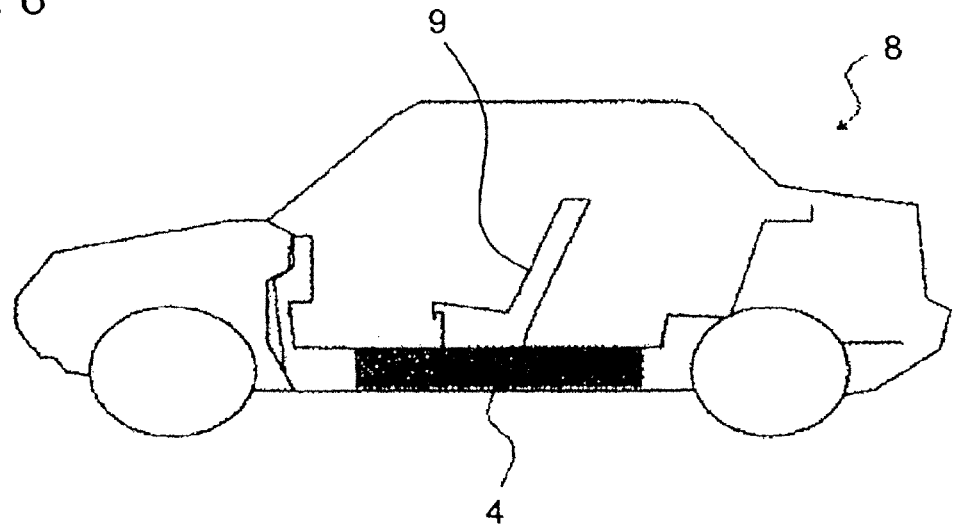
FIG. 8 is a schematic view illustrating an example of the use of the module assembly.

The module assembly 4 shown in FIG. 7 is utilized for various purposes. As an example, the module assembly is often utilized for an electric vehicle battery. For instance, as shown in FIG. 8, the module assembly 4 is laid out under a seat 9 of an electric vehicle 8. By the way, when a plurality of module assemblies 4 are laid out under the seat 9 of the electric vehicle 8, the plurality of module assemblies 4 may be laid out in a stacked state in a space defined under the seat 9. That is, housing 5 may be eliminated.

By installing the module assembly that the battery modules, each having the film covered batteries of the invention stacked up in their thickness directions, are stacked up in the height direction of the electric vehicle, under the seat, it is possible to enhance the design flexibility of the vehicle interior space of the seat upper part.

(Screening Method)

Next, a method of manufacturing the film covered battery 1 shown in FIGS. 1-2 is hereunder explained. However, detailed description of processes common to a generally-known manufacturing method will be omitted. Hereupon, of processes for manufacturing the film covered battery 1, a process for screening the film covered battery with a hollow and the film covered battery without a hollow is hereunder described.

Figure 9:
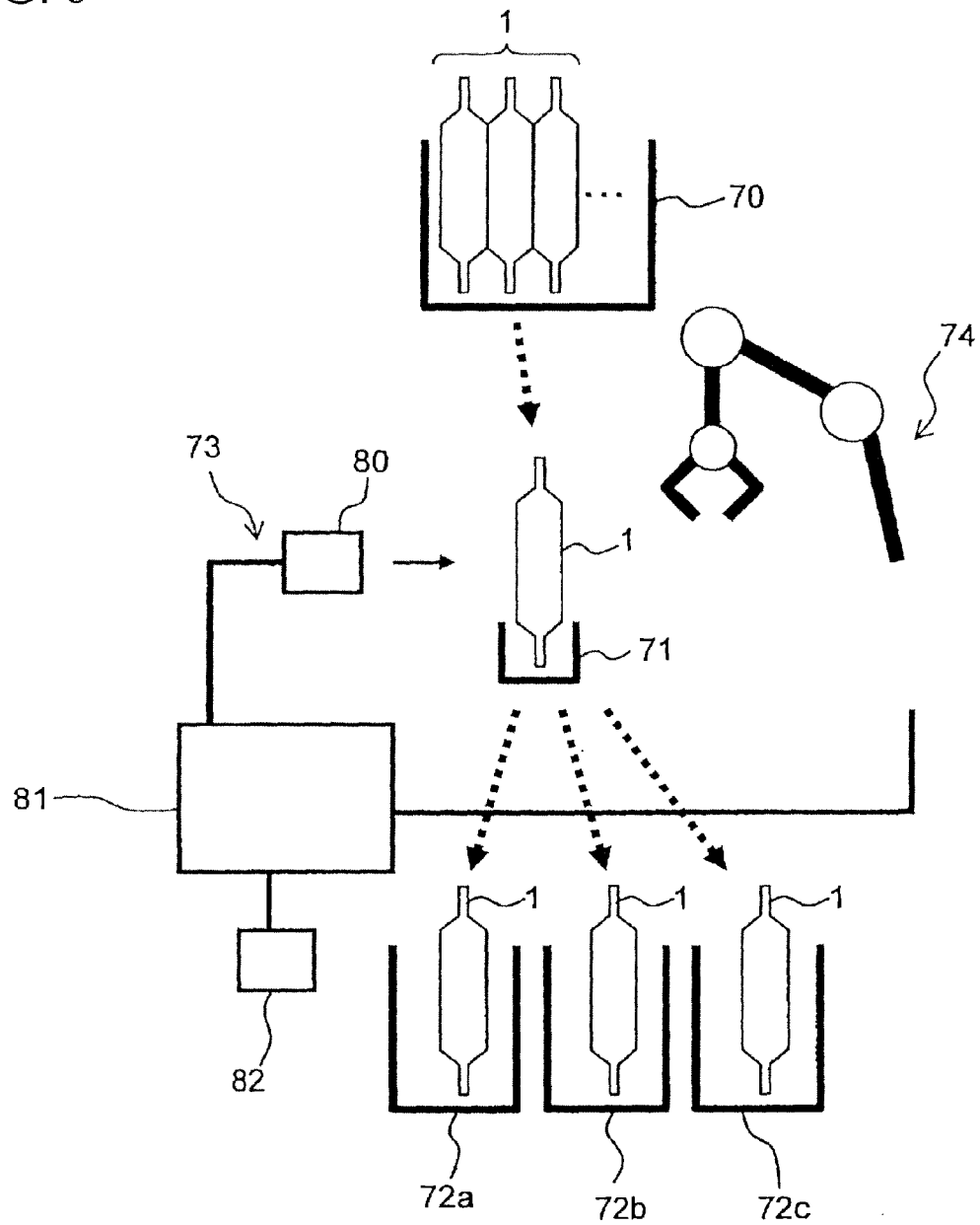
FIG. 9 is a schematic view illustrating a part of a manufacturing line of the film covered battery.
Figure 10:
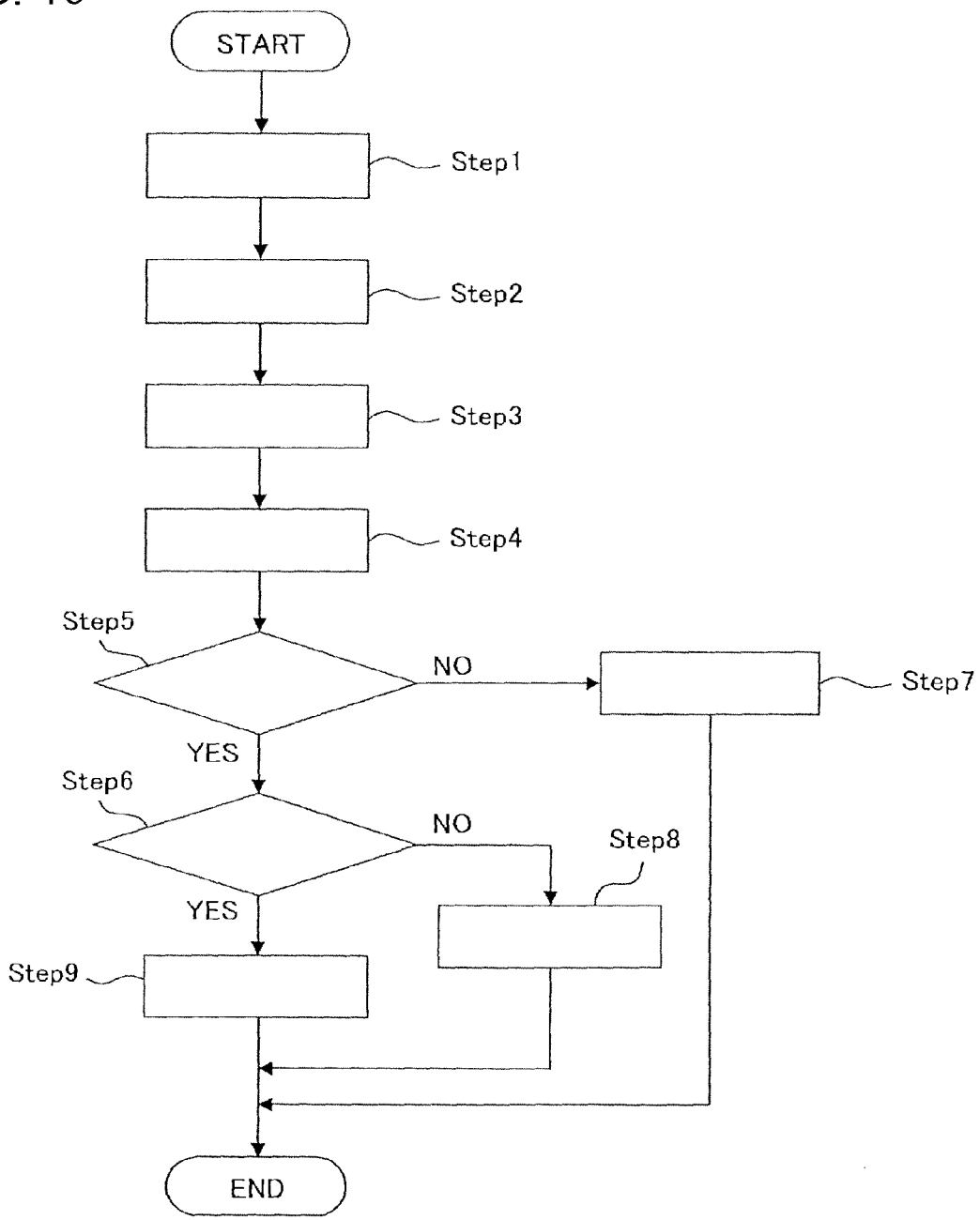
FIG. 10 is a chart illustrating a screening process of the film covered battery.

FIG. 9 is the schematic view illustrating a part of the manufacturing line of the film covered battery 1. FIG. 10 is the flowchart illustrating the flow of the screening process.

As shown in FIG. 9, provided on the manufacturing line are a common tray 70, an inspection stage 71, distribution trays 72a, 72b, and 72c, a determination means 73, and a locomotion means 74. The determination means 73 is comprised of a camera 80, a computer 81 for image-processing picture images photographed by the camera 80 and for determining the presence or absence of a very small hollow, and a memory 82 for storing programs executed by the computer 81 and various data. The locomotion means 74 is comprised of a robot arm configured to operate based on a command from the computer 81.

Each step of the flowchart of FIG. 10 are as follows:

Step 1: Pick up the film covered battery 1 from the common tray 70.

Step 2: Move the film covered battery 1 to the inspection stage 71.

Step 3: Take a picture of the film covered battery 1 on the inspection stage 71 by the camera 80.

Step 4: Image-process the photography image by the computer 81.

Step 5: Determine whether a very small hollow is present.

Step 6: Determine whether the very small hollow is within predetermined regions.

Step 7: Move to the distribution tray 72a.

Step 8: Move to the distribution tray 72b.

Step 9: Move to the distribution tray 72c.

The flow of the screening process is hereinafter explained in reference to FIG. 10. The common tray 70, in which a plurality of film covered batteries 1 are stored, is conveyed to a predetermined position by means of a conveyance means (not shown). Immediately when the common tray 70 has been conveyed to the predetermined position, the robot arm 74 picks up any one of the film covered batteries 1 from the common tray 70 (see Step 1), and then moves the picked-up film covered battery 1 to the inspection stage 71 (see Step 2). Next, a picture image of the film covered battery 1 on the inspection stage 71 is taken by the camera 80 (see Step 3).

The photography image, taken by the camera 80, is inputted into the computer 81, and then the inputted photography image is image-processed by the computer 81 (see Step 4). Subsequently, the computer 81 discriminates or determines, based on the result of the image-processing, the presence or absence of a very small hollow (see Step 5). Concretely, the computer 81 detects, based on brightness information within the photography image, the border (the edge) of the film covered battery 1 and a very small hollow. More concretely, within the photography image, the brightness tends to rapidly change in front and in rear of picture elements, corresponding to the border of the film covered battery 1. Thus, the border of the film covered battery 1 can be detected by obtaining the picture element, whose brightness rapidly changes as compared to the picture elements adjacent to each other, and its coordinates. Furthermore, when a very small hollow is present on the surface of the film covered battery 1, the brightness tends to rapidly change in front and in rear of the picture element, corresponding to the very small hollow. Thus, the presence or absence of a very small hollow can be detected by determining whether the picture element, whose brightness rapidly changes as compared to the picture elements adjacent to each other, is present or absent inside of the detected border of the film covered battery 1.

When a very small hollow has been detected, that is, when the picture element, whose brightness rapidly changes as compared to the picture elements adjacent to each other, has been found, the computer 81 determines whether or not the very small hollow is present in either one of the previously-discussed first region 60 and the previously-discussed second region 62 (see Step 6). Concretely, the computer 81 is configured to obtain the coordinates of the picture element, corresponding to the very small hollow, (i.e., the picture element whose brightness rapidly changes as compared to the picture elements adjacent to each other). On the other hand, region information, indicating the coordinates of the boundary of the first region 60 or the coordinates of the boundary of the second region 62, is pre-stored in the memory 82. The computer 81 compares the region information read from the memory 82 with the coordinates of the picture element corresponding to the very small hollow, and then determines whether the very small hollow is present inside of the first region 60 or the second region 62.

When Step 5 determines that a very small hollow is absent, the film covered battery 1 is moved to the first distribution tray 72*a* by the robot arm 74 (see Step 7).

When Step 6 determines that a very small hollow is present outside of the predetermined regions, the film covered battery 1 is moved to the second distribution tray 72*b* by the robot arm 74 (see Step 8). In contrast when Step 6 determines that a very small hollow is present in the predetermined regions, the film covered battery 1 is moved to the third distribution tray 72*c* by the robot arm 74 (see Step 9).

Additionally, when Step 6 determines that a very small hollow is present in the predetermined regions and thus the previously-discussed cover film 50 is attached to the very small hollow, a process for determining whether the cover film 50 protrudes from the predetermined regions may be carried out as an additional process. Concretely, size information, indicating the size of cover film 50, is pre-stored in the memory 82. The computer 81 performs the above-mentioned determination based on the size information and the region information, both read from the memory 82, and the coordinates indicating the center of the very small hollow. At this time, the above-mentioned determination is made on the assumption that the cover film 50 is attached such that the center of the cover film 50 and the center of the very small hollow coincide with each other.

Furthermore, a symbol or a character, indicating the result of determination through Step 5 and the result of determination through Step 6, may be printed on the surface of the film covered battery 1. For instance, when printing, an ink jet printer may be utilized. In the case that a symbol, indicating the result of determination, has been printed, it is unnecessary to distribute, based on the result of determination, the film covered battery 1 into an appropriate one of the different distribution trays 72*a*-72*c*.

Moreover, the cover film may be attached to the very small hollow by means of a manipulator or the like, while using the detected coordinate data.

The invention claimed is:

1. A film covered battery comprising:
a battery element equipped with a plurality of electrode plates laminated via separators;
an exterior film structured to hermetically seal the battery element; and
a cover film configured to cover a hollow indentation disposed in an outside surface of the exterior film and partially attached to a part of the outside surface of the exterior film to cover the hollow indentation, the cover film being present in predetermined regions set on the outside surface of the exterior film, wherein the predetermined regions are regions of projected regions excluding overlap regions, the projected regions being projections of the electrode plates to the outside surface of the exterior film, the overlap regions being
(1) regions where the projected regions overlap with a binding member interposed between an uppermost electrode plate and the exterior film and a lowermost electrode plate and the exterior film for binding the plurality of electrode plates laminated via the separators,
(2) regions where the projected regions overlap with an insulating film interposed between an associated electrode plate and a separator adjacent to the associated electrode plate, or
(3) regions determined by both the binding member, whose ends are fixed to the uppermost electrode plate and the lowermost electrode plate respectively, and the insulating film placed between the associated electrode plate and the separator adjacent to the associated electrode plate,
wherein a thickness of the cover film is less than or equal to (i) a thickness of the binding member or (ii) one-half of a summed thickness of all the insulating films each interposed between the associated electrode plate and the separator adjacent to the associated electrode plate, and
wherein attachment of the cover film to cover the hollow indentation disposed in the outside surface of the exterior film does not increase an overall thickness of the film covered battery.

2. The film covered battery as recited in claim 1, wherein:
a first end of the binding member is fixed to the uppermost electrode plate, and
a second end of the binding member is fixed to the lowermost electrode plate.

3. The film covered battery as recited in claim 2, wherein:
the predetermined regions include a first region set on the outside surface of the exterior film at a first side of the film covered battery and a second region set on the outside surface of the exterior film at a second side of the film covered battery, the second side being opposite to the first side;
the first region is a region excluding a first overlap region from a projected region, the projected region being a projection of the uppermost electrode plate to the outside surface of the exterior film at the first side of the film covered battery, the first overlap region overlapping with a first end of the binding member fixed to the uppermost electrode plate;
the second region is a region excluding a second overlap region from a projected region, the projected region being a projection of the lowermost electrode plate to the outside surface of the exterior film at the second side of the film covered battery, the second overlap region overlapping with a second end of the binding member fixed to the lowermost electrode plate; and
the cover film is attached to at least one of the first region and the second region.

4. The film covered battery as recited in claim 1, wherein:
a binding member is not provided; and
the overlap regions are regions where the projected regions overlap with the insulating film.

5. The film covered battery as recited in claim 1, wherein:
the electrode plates comprise large electrode plates having a first area and small electrode plates having a second area, the second area being smaller than the first area;

the electrode plates constructing the projected regions are the small electrode plates; and the insulating film is interposed between an associated small electrode plate and a separator adjacent to the associated small electrode plate.

6. A battery module comprising:

a plurality of film covered batteries housed in a stacked state, each of the film covered batteries comprising the film covered battery as recited in claim 1, wherein the plurality of film covered batteries are stacked along a lamination direction of the electrode plates constructing the battery element.

7. A module assembly comprising:

a plurality of battery modules, each of the battery modules comprising the battery module as recited in claim 6, wherein the plurality of battery modules are arranged in a stacked state and connected to each other.

8. An electric vehicle comprising:

the module assembly as recited in claim 7, wherein the module assembly is placed under a vehicle seat.

9. The film covered battery as recited in claim 1, wherein:

the exterior film is comprised of a protective layer, a metal layer, and a heat-fusion bonding layer, the protective layer comprises the outside surface of the exterior film, and the heat-fusion bonding layer comprises an inside surface of the exterior film.

10. The film covered battery as recited in claim 9, wherein:

the protective layer is formed of polyethylene terephthalate (PET), the metal layer is formed of aluminum, and the heat-fusion bonding layer is formed of polypropylene (PP).

11. The film covered battery as recited in claim 1, wherein the cover film is comprised of an adhesive layer and a resin layer.

12. The film covered battery as recited in claim 1, wherein the cover film is not present in the overlap regions.

* * * * *